United States Patent
Hirano et al.

(10) Patent No.: US 7,056,618 B2
(45) Date of Patent: Jun. 6, 2006

(54) METHOD AND STRUCTURE FOR CONNECTING BATTERIES

(75) Inventors: Fujio Hirano, Hiratsuka (JP); Akio Kujirai, Zama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 435 days.

(21) Appl. No.: 10/432,635

(22) PCT Filed: Dec. 13, 2001

(86) PCT No.: PCT/JP01/10952

§ 371 (c)(1),
(2), (4) Date: Jun. 10, 2003

(87) PCT Pub. No.: WO02/49129

PCT Pub. Date: Jun. 20, 2002

(65) Prior Publication Data

US 2004/0053126 A1    Mar. 18, 2004

(30) Foreign Application Priority Data

Dec. 13, 2000 (JP) .............................. 2000-378654

(51) Int. Cl.
*H01M 2/22* (2006.01)

(52) U.S. Cl. ...................... 429/157; 429/158; 29/623.4

(58) Field of Classification Search ................ 429/157, 429/158, 159; 29/623.4
See application file for complete search history.

(56) References Cited

U.S. PATENT DOCUMENTS

| 5,900,332 | A | 5/1999 | Marukawa et al. ......... 429/158 |
| 6,120,564 | A | 9/2000 | Marukawa et al. ......... 29/623.1 |
| 6,632,562 | B1* | 10/2003 | Nakatsuka et al. ......... 429/158 |
| 6,673,485 | B1* | 1/2004 | Kimura et al. ......... 429/157 X |

FOREIGN PATENT DOCUMENTS

| EP | 1120841 | 8/2001 |
| EP | 1139462 | 10/2001 |
| JP | 10106533 | 4/1998 |
| JP | 2000-149907 | 5/2000 |
| JP | 2000-266843 | 9/2001 |
| WO | WO 00/13241 | * 3/2000 |

OTHER PUBLICATIONS

English Language Abstract of JP Appln. No. 2000-149907, May 2000.
English Language Abstract of JP Appln. No. 10-106533, Apr. 1998.
English Language Abstract of JP 2001-266843, Sep. 2001.

* cited by examiner

*Primary Examiner*—Stephen J. Kalafut
(74) *Attorney, Agent, or Firm*—Greenblum & Bernstein, P.L.C.

(57) ABSTRACT

A plurality of projections for projection welding are formed respectively on the opposite sides of a connector. The electrode plate of the sealing member of one of two adjacent cells is bonded and connected by projection welding to a side of the connector by way of the projections, while the cell case of the other cell is bonded and connected by projection welding to the other side of the connector by way of the projections. In this way, a plurality of cells are connected in series.

9 Claims, 10 Drawing Sheets

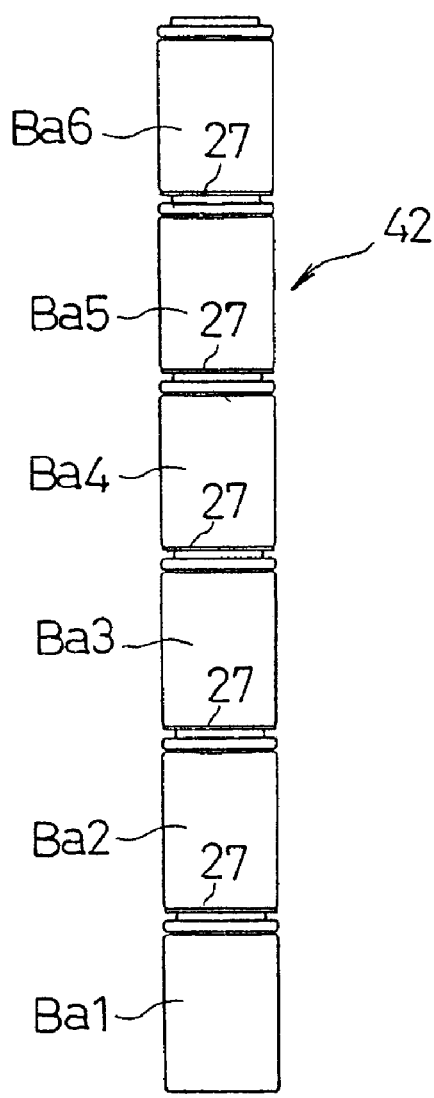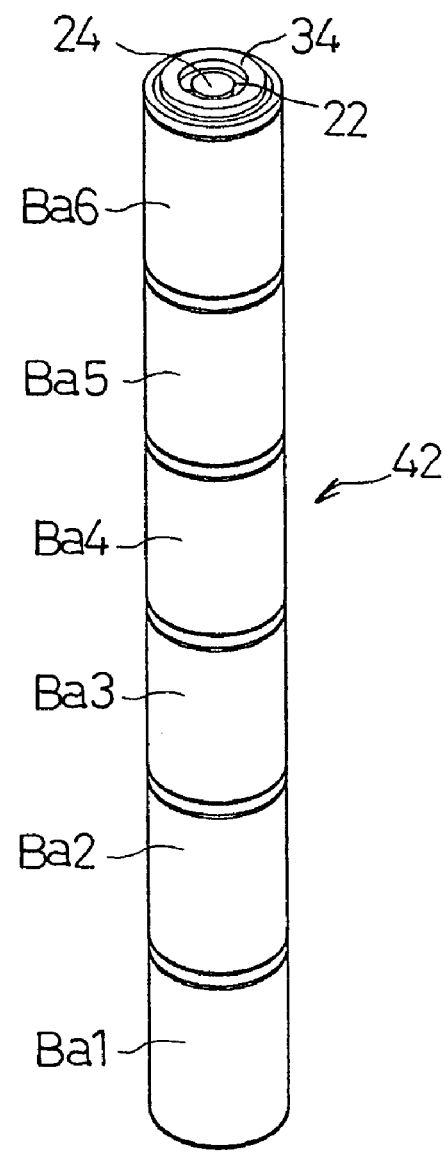

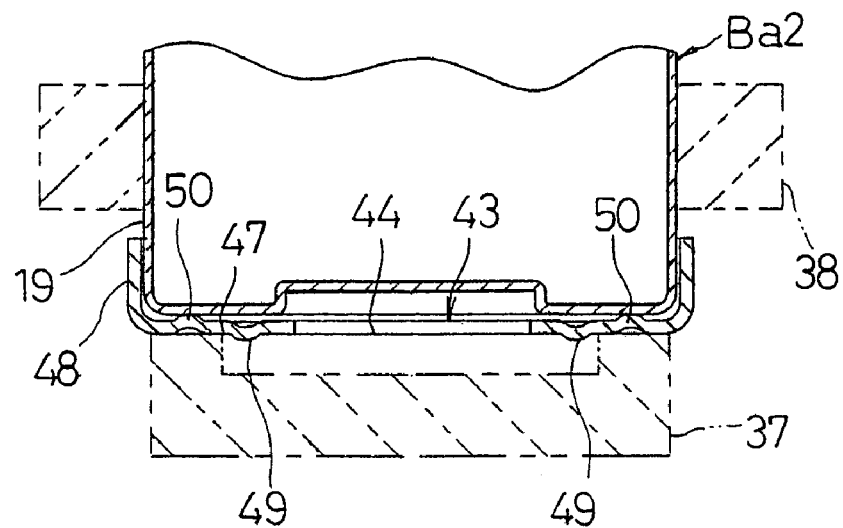
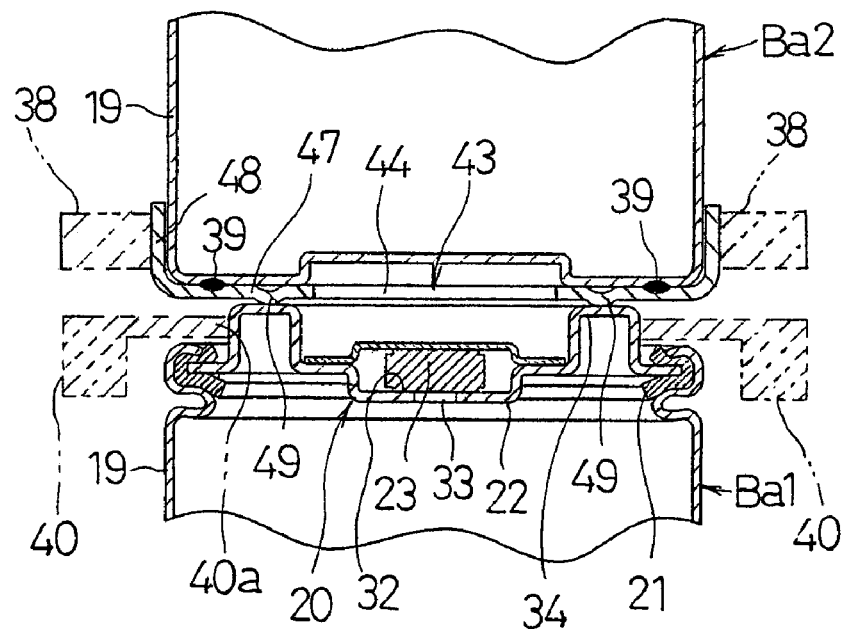

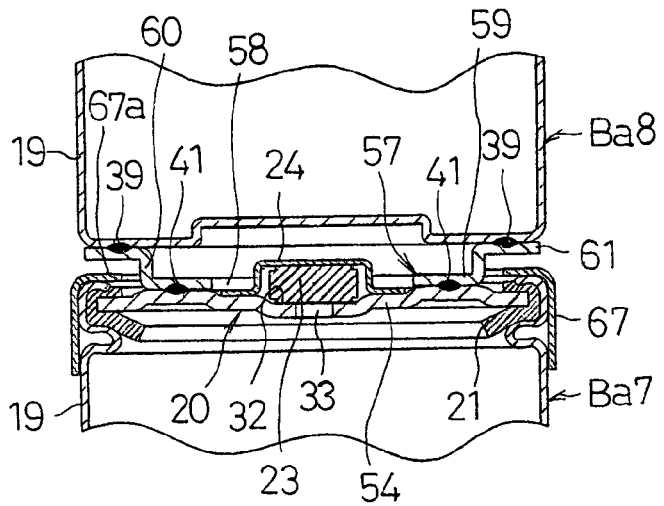
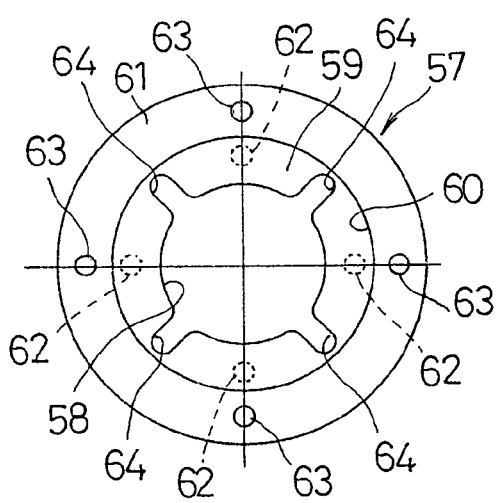
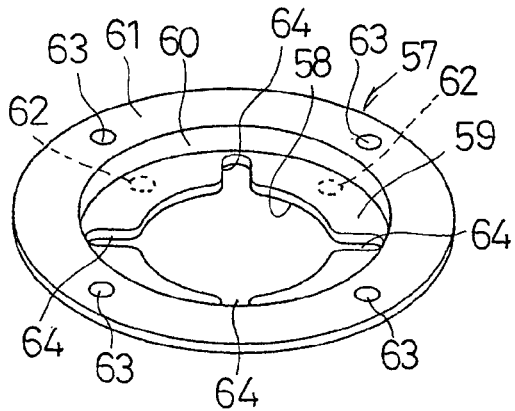
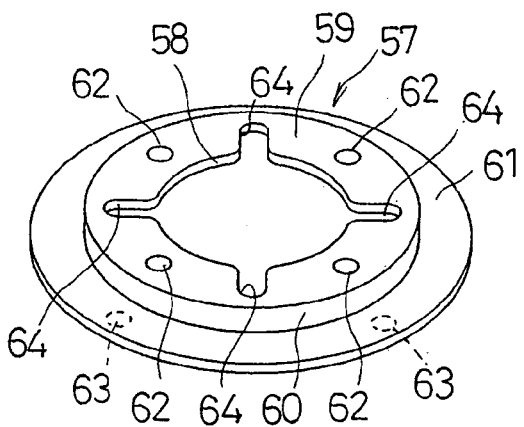

METHOD AND STRUCTURE FOR CONNECTING BATTERIES

TECHNICAL FIELD

The present invention relates to a method and a structure for connecting a plurality of cells in series for forming a battery module that produces a desired output voltage.

BACKGROUND ART

Ordinary cells include a bottomed cylindrical metal cell case that is open only at an end thereof and operates as negative electrode, and a sealing member having a metal electrode plate operating as positive electrode. For connecting a plurality of cells in series, the electrode plate of each of the cells and the cell case of the adjacent cell are electrically and mechanically connected to related respective spots of a single connector by spot welding.

During the spot welding operation, no pinching pressure is applied to the parts being welded by welding electrodes and a large electric current flows between the welding electrodes as surface current running along the surfaces of the connector and the electrode plate. A connector having a large thickness or showing a low specific resistance cannot be used because such a connector makes the welding operation highly difficult. As a result, the electric resistance of the connection between the cells becomes large to give rise to a large loss at the connection of the cells where a large electric current flows. Additionally, the strength of the mechanical link of the cells is inevitably weak because of the weak mechanical strength of the connector itself.

In view of the above mentioned circumstances, the inventors of the present invention has already proposed cell connecting structures showing a reduced connection resistance and an enhanced connection strength as respectively shown in FIGS. 13 and 14 by improving the structure of known connectors and the conventional welding method. In the case of a proposed cell connecting structure (see Japanese Patent Laid-Open Publication No. 2000-149907) as shown in FIG. 13, a connecting electrode section 3 is formed on the electrode plate 7 of the sealing member 2 for closing the opening of a cell case 1, the connecting electrode section projecting axially outwardly. Then, the connecting electrode section 3 of the cell B1 of a pair of adjacent cells B1 and B2, is welded to the bottom surface 4 of the cell case 1 of the other cell, namely the cell B2, by projection welding by way of projections (not shown) formed on the connecting electrode section 3, and the connecting electrode section 3 and the bottom surface 4 are directly welded on each other at nuggets 8, thereby connect the cells B1 and B2 in series.

With a proposed cell connecting structure (see Japanese Patent Laid-Open Publication No. Hei. 10-106533) as shown in FIG. 14, a connector 9 is employed to connect a pair of adjacent cells B3 and B4. The connector 9 includes a flat bottom section 11 to be held in contact with the electrode plate 10 of one of the cells, namely the cell B3, operating as positive electrode, and a cylindrical section 12 to be arranged like a sleeve around the cell case 1 of the other cell, namely the cell B4, operating as negative electrode. The cylindrical section 12 is provided with a plurality of circularly arranged projections 13 to be used for projection welding, while the bottom section 11 is also provided with a plurality of circularly arranged projections 14 to be used for projection welding. Note that FIG. 14 shows the arrangement before the welding operation. The connector 9 and the cell B3 are welded one on the other as they are welded to each other by projection welding by way of the projections 14 on the bottom section 11, while the connector 9 and the cell B4 are welded on each other as they are welded to each other by projection welding by way of the projections 13 on the inner surface of the cylindrical section 12 on the cell case 1.

The above described cell connecting structures are so designed as to bond the adjacent cells B1, B2, B3, and B4 respectively by projection welding to establish an electric connection there. With the projection welding, the two components to be welded are brought into contact with each other by way of the small areas of the projections 13 and 14 so that the electric current flowing through them is concentrated in the small contact areas to generate heat there because of the high electric resistance and melt the projections for welding. Consequently, unlike spot welding, these arrangements do not require high pinching pressure.

However, the above described cell connecting structures are still accompanied by problems that needs to be dissolved before marketing them, and they need improvements. In the case of the cell connecting structure of FIG. 13, the electric plate 7 is formed by press molding so that the projections on the electrode plate 7 to be used for projection welding are inevitably made thin. Then, as the electric current flowing through the components to be welded is concentrated in the thin projections during the projection welding process, the thin projections may become molten excessively to give rise to cracks there so that consequently the electrolyte contained in the cells may leak out through the cracks.

On the other hand, the cell connecting structure shown in FIG. 14 requires that the bottom section 11 of the connector 9 is welded on the electrode plate 10 of the cell B3 by projection welding and subsequently the cylindrical section 12 of the connector 9 is welded on the cell case 1 of the cell B4 also by projection welding. The latter projection welding operation needs to be conducted in a very unstable condition.

More particularly, the cell case 1 of the cell B4 is sleeved by the cylindrical section 12 of the connector 9 so that the plurality of projections 13 for projection welding projecting from the inner surface of the cylindrical section 12 are made to abut the outer peripheral surface of the cell case 1. Then, under this condition, the positive and negative welding electrodes 17 and 18 are made to abut the outer peripheral surface of the cell case 1 and the cylindrical section 12 respectively and an electric current is made to flow from the cell case 1 to the cylindrical section 12 by way of the projections 13 for projection welding.

Thus, it is not easy to successfully carry out the projection welding operation because the welding electrode 18 needs to abut the outer surface of the cylindrical section 12 that is held in an unstable state. In other words the adjacent cells B3 and B4 may not necessarily be bonded to each other in a good condition to establish an electric connection between them.

Additionally, the projections 13 of the connector 9 need to have accurately a same height so that they are made to abut the outer peripheral surface of the cell case 1 under even and uniform pressure. Still additionally, although not shown in FIG. 14, the cylindrical section 12 is provided with a plurality of slits in order to provide it with resiliency so that it applies pressure onto the cell case 1 when it is put on the cell case 1. This means that the connector 9 has a complex profile and requires precision processes for forming it in good shape.

In the light of the above mentioned problems, an object of the present invention is to provide a method and a structure for connecting cells that allow a projection welding operation of bonding and electrically connecting two adjacent cells to be carried out easily and reliably and secures a good welding quality for the projection welding operation without giving rise to any problems such as solution leakage.

DISCLOSURE OF THE INVENTION

According to one aspect of the invention, there is provided a structure for connecting adjacent ones of a plurality of cells arranged in series by the use of connectors in order to establish electric connection thereof, each of the cells having a bottomed cylindrical cell case operating as an electrode and a sealing member for closing the opening of the cell case, the sealing member operating as the opposite electrode; each of the connectors having a plurality of projections for projection welding formed on each of the opposite sides thereof; an electrode plate of the sealing member of one of the two adjacent cells to be connected by the corresponding one of the connectors being bonded to a side of the connector by projection welding by way of the projections on the side; the cell case of the other cell being bonded to the other side of the connector by projection welding by way of the projections on the other side so as to connect the plurality of cells in series.

According to another aspect of the invention, there is provided a method for connecting adjacent ones of a plurality of cells arranged in series by the use of connectors in order to establish electric connection thereof, each of the cells having a bottomed cylindrical cell case operating as an electrode and a sealing member for closing the opening of the cell case, the sealing member operating as the opposite electrode, the method including:

forming a plurality of projections for projection welding on each of the opposite sides of each of the connectors having a plate-shaped outer profile corresponding to the outer profile of the cell case;

placing the bottom of the cell case of one of any two adjacent cells in contact with the projections on one side of the corresponding one of the connectors;

abutting welding electrodes respectively on the other side of the connector and the outer peripheral surface of the cell case;

applying a voltage across the welding electrodes for bonding the bottom of the cell case and the side of the connector;

placing an axially outwardly projecting connecting electrode section of the electrode plate of the other cell in contact with the projections of the other side of the connector;

abutting the welding electrodes respectively on the peripheral surface of the connecting electrode section and the outer peripheral surface of the cell case of the cell; and applying a voltage across the welding electrodes for bonding the connecting electrode section and the other side of the connector, thereby connecting the plurality of cells in series.

According to still another aspect of the invention, there is also provided a method for connecting adjacent ones of a plurality of cells arranged in series by the use of connectors in order to establish electric connection thereof, each of the cells having a bottomed cylindrical cell case operating as an electrode and a sealing member for closing the opening of the cell case, the sealing member operating as the opposite electrode, each of the connectors having an outer profile corresponding to the outer profile of the cell case and formed by a flat bottom and a cylindrical section standing perpendicularly from the periphery of the flat bottom, the method including:

forming a plurality of projections for projection welding on each of the opposite sides of each of the connectors;

placing the bottom of the cell case of one of any two adjacent cells in contact with the projections on one side of the corresponding one of the connectors;

abutting welding electrodes respectively on the other side of the connector and the outer peripheral surface of the cell case;

applying a voltage across the welding electrodes for bonding the bottom of the cell case and the side of the connector;

placing an axially outwardly projecting connecting electrode section of the electrode plate of the other cell in contact with the projections of the other side of the connector;

abutting the welding electrodes respectively on the peripheral surface of the connecting electrode section and the outer peripheral surface of the cell case of the cell; and applying a voltage across the welding electrodes for bonding the connecting electrode section and the other side of the connector, thereby connecting the plurality of cells in series.

According to a further aspect of the invention, there is also provided a method for connecting adjacent ones of a plurality of cells arranged in series by the use of connectors in order to establish electric connection thereof, each of the cells having a bottomed cylindrical cell case operating as an electrode and a sealing member for closing the opening of the cell case, the sealing member operating as the opposite electrode, each of the connectors having a bottom, a wall section standing upward perpendicularly from the outer periphery of the bottom and a connection flange extending outwardly from the top end of the wall section in parallel with the bottom, the method including:

forming a plurality of projections for projection welding on the bottom surface of one of the opposite sides of each of the connectors and also a plurality of projections for projection welding on the opposite side of the connection flange of the connector;

placing a flat electrode plate of one of any two adjacent cells in contact with the projections on the bottom of the corresponding one of the connectors;

abutting welding electrodes on the respective positions on the other side of the connector corresponding to the projections on the sides of the connector;

applying a voltage across the welding electrodes for bonding the electrode plate and the connector;

placing the bottom of the cell case of the other cell in contact with the projections on the connection flange of the connector, abutting the welding electrodes respectively on the corresponding surface of the connection flange and the outer peripheral surface of the cell case of the other cell; and applying a voltage across the welding electrodes for bonding the connection flange and the bottom of the cell case, thereby connecting the plurality of cells in series.

These and other objects and characteristics of the present invention will become clear from the following description with reference to the accompanying drawings.

BRIEF DESCRIPTION OF THE DRAWINGS

FIGS. 4A and 4B are respectively a front view and a perspective view of a battery module made by bonding and electrically connecting a plurality of cells by employing the cell connecting structure as shown in FIG. 1;

FIG. 7A is a cross sectional view of a step of bonding two cells in the second embodiment, showing the connector before being welded to the cell case of one of the cells, FIG. 7B is a cross sectional view of the connector before being welded to the electrode plate of the other cell;

FIG. 9 is a longitudinal cross sectional view of a cell connecting structure according to a third embodiment of the invention;

FIGS. 10A, 10B, 10D are respectively a plan view, a perspective over view, a front view, and a perspective under view of the connector used in the third embodiment;

BEST MODE FOR CARRYING OUT THE INVENTION

Hereinafter, the present invention will be described in greater detail with reference to the accompanying drawings that illustrate preferred embodiments of the invention.

Figure 1:
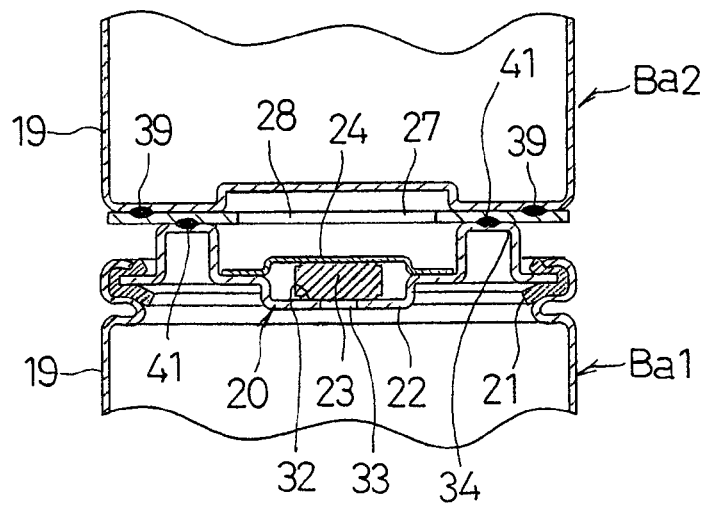
FIG. 1 is a longitudinal cross sectional view of a cell connecting structure according to a first embodiment of the invention.

FIG. 1 is a schematic longitudinal cross sectional view of a cell connecting structure according to a first embodiment of the invention. Note that FIG. 1 shows only an essential part of a battery module to which the present invention is applied and the electricity generating elements and other components that are not directly related to the present invention are omitted from it. Two adjacent cells Ba1 and Ba2 that are to be connected are produced according to same specifications and cell cases 19 and 19 of the cells have a bottomed cylindrical profile so as to respectively cover the entire cells except open ends thereof and are adapted to operate as negative electrodes. The open end of each of the cell cases 19 and 19 is closed by a sealing member 20 that includes a gasket 21, an electrode plate 22 operating as a positive electrode, a rubber vent 23, and a vent holder plate 24.

More specifically, the electrode plate 22 is circular in plan and is electrically insulated along the periphery thereof by the gasket 21 relative to the corresponding cell case 19. It is rigidly secured to the edge of the opening of the corresponding caulked cell case 19 by way of the gasket 21. The electrode plate 22 has at the center thereof a round vent receiving recess 32 having a saucer-like profile that provides a space for containing the rubber vent 23 and is provided at the center thereof with a gas release hole 33. The rubber vent 23 has a disk-like profile and is contained in the vent receiving recess 32 and sealed by the vent holder plate 24 operating as positive electrode so as to close the gas release hole 33. When the gas pressure in the corresponding cell is raised abnormally to get to a predetermined vent opening level, the rubber vent 23 is elastically deformed to open the gas release hole 33 under gas pressure applied thereto. Then, as a result, gas is released from the inside of the cell to the outside of the cell by way of the gas release hole 33 and the gas discharge hole (not shown) of the vent holder plate 24.

Figure 13:
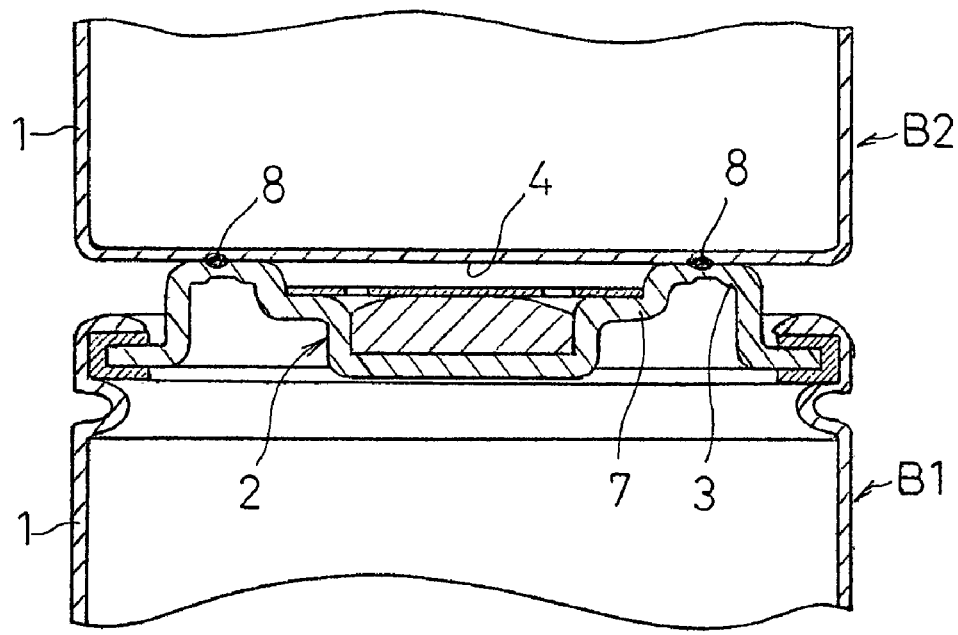
FIG. 13 is a longitudinal cross sectional view of a conventional cell connecting structure.

While the electrode plate 22 resembles the electrode plate 7 of the cell connecting structure of FIG. 13 in terms of a ring-shaped connecting electrode section 34 projecting upward from a zone located near the outer peripheral edge, it does not have any projections for projection welding that the electrode plate 7 has in the connecting electrode section 3.

In the above described cell connecting structure, the two adjacent cells Ba1 and Ba2 are connected in series as the connecting electrode section 34 of the electrode plate 22 of one of the cells, namely the cell Ba1, and the bottom of the cell case 19 of the other cell Ba2 are connected by way of connector 27. The connector 27 has a profile as shown in FIGS. 2A, 2B, and 2C, which are respectively a plan view, a perspective view and a front view thereof.

Figure 2A:
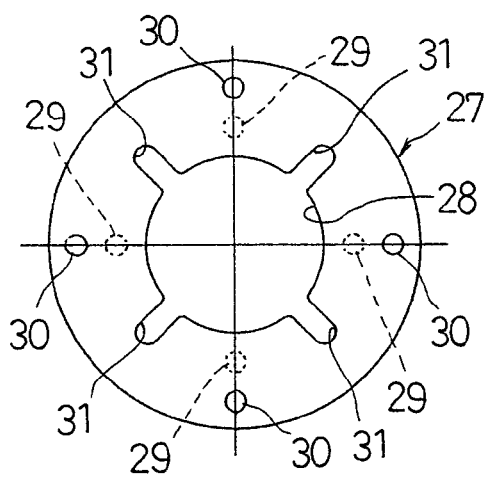
FIGS. 2A, 2B and 2C are respectively a plan view, a perspective view and a front view of the connector used in the first embodiment.
Figure 2C:
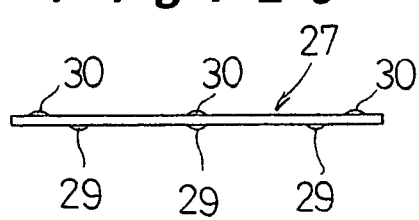
Figure 2B:
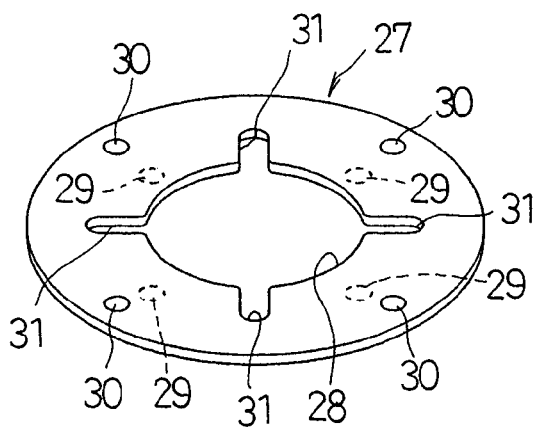

Referring now to FIGS. 2A through 2C, the connector 27 is made of a metal disk having a diameter slightly smaller than the outer diameter of the cell case 19 and a concentric through hole 28 formed at the center thereof to make it show a ring-like profile. Four projections 29 for projection welding are formed along an imaginary circle on a side (the lower side in FIG. 2C) of the connector 27, while four projections 30 for projection welding are also formed along another imaginary circle on the other side (the upper side in FIG. 2C) of the connector 27. As seen from FIG. 2A, the corresponding ones of the projections 29 and 30 are radially aligned. Notches 31 are formed along the through hole 28 at the respective middle positions of any adjacent ones of the projections 29 or 30. The notches 31 are designed to reduce the reactive current that can flow when the projections are welded.

Figure 3A:
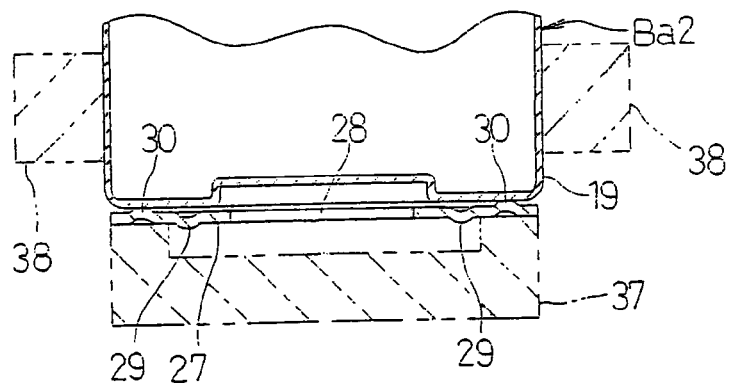
FIG. 3A is a cross sectional view of a step of bonding two cells in the first embodiment, showing the connector before being welded to the cell case of one of the cells.
Figure 3B:
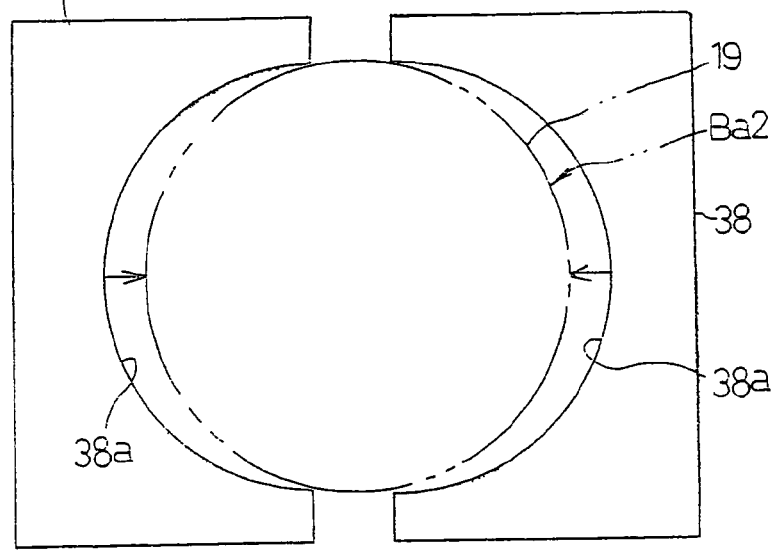
FIG. 3B is a plan view of the welding electrodes to be used for the welding.

Now, the process for connecting the two cells Ba1 and Ba2 by the use of the connector 27 will be described with reference to FIGS. 3A through 3C. Firstly, the connector 27 is welded to the bottom of the cell case 19 of the cell Ba2 located above the other cell Ba1. FIG. 3A is a schematic longitudinal cross sectional view showing the connector 27 before being welded to the cell Ba2. The connector 27 is mounted on a positive welding electrode 37 and supported by the latter from under at the projections 30 and then the cell Ba2 is mounted on the connector 27 while a paired pieces of negative welding electrode 38 are made to abut the outer peripheral surface of the cell case 19 of the cell Ba2. As shown in FIG. 3B, the paired pieces of negative welding electrode 38 have respective semicircular contact surfaces 38a that correspond to the outer profile of the cell case 19 and come to contact the cell case 19 at the opposite sides thereof as they are forced to directly pinch the cell case 19. Under this condition, the cell Ba2 is pressed downward so that the bottom of the cell case 19 is pressed against the corresponding four projections 30 of the connector 27.

Then, a predetermined high DC voltage is applied across the welding electrodes 37 and 38 from an inverter DC source for 10 msec. for projection welding. The welding current is concentrated to the contact areas of the small projections 30 and the cell case 19 that are very small and hence exhibit a small contact resistance so that consequently the projections 30 are molten by generated heat and the connector 27 and the cell case 19 are welded onto each other at nuggets 39 shown in FIGS. 1 and 3C as almost the entire upper surface of the connector 27 is held in tight contact with the bottom surface of the cell case 19. Thus, the connector 27 and the cell case 19 of the upper cell Ba2 are bonded together.

Figure 3C:
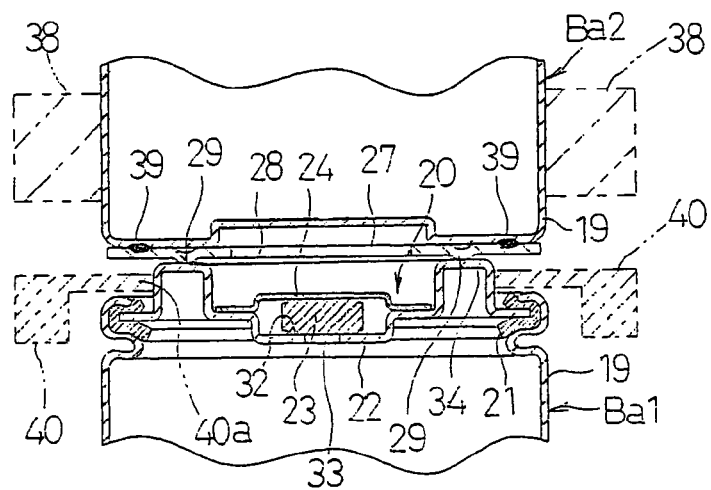
FIG. 3C is a cross sectional view of the connector before being welded to the electrode plate of the other cell.

Subsequently, as shown in FIG. 3C, the connector 27 bonded to the bottom surface of the cell case 19 of the cell Ba2 is mounted on the connecting electrode section 34 of the electrode plate 22 of the lower cell Ba1 and the paired pieces of negative welding electrode 38 are made to contact the outer peripheral surface of the cell case 19 of the upper cell Ba2 while a plate-shaped insert 40a of a positive welding electrode 40 is made to contact the periphery of the connecting electrode section 34 of the lower cell Ba1 for projection welding. Thereby, the projections 29 are molten by generated heat and the connector 27 and the electrode plate 22 are welded onto each other at nuggets 41 shown in FIG. 1 as an annular section of the lower side of the connector 27 bearing the four projection 29 is held in tight contact with the connecting electrode section 34 of the electrode plate 22. Thus, the connector 27 and the electrode plate 22 of the lower cell Ba1 are bonded together and hence the cells Ba1 and Ba2 are connected in series by way of the connector 27.

The positive welding electrode 40 that is brought to contact the periphery of the connecting electrode section 34 has the plate-shaped insert 40a having a thickness adapted to make itself to be inserted into the gap between the top of the cell Ba1 and the connector 27, and the plate-shaped insert 40a is provided on the opposite sides thereof except the contact surface at the front end thereof with an insulating sheet typically formed by applying a fluorine type resin. The plate-shaped insert 40a is thus prevented from contacting the connector 27 and/or the cell case 19 of the cell Ba1 and producing an electric short-circuit when it is inserted into the narrow gap.

A number of cells for producing the desired output voltage are bonded together to produce a battery module employing the above described cell connecting structure. For example, six cells Ba1 through Ba6 may be bonded to produce a battery module 42 as shown in FIGS. 4A and 4B. An ordinary cell may be used for the uppermost cell Ba6. In the above described cell connecting structure, it is not necessary to form projections for projection welding on the connecting electrode section 34 of the electrode plate 22 because the projections 29 and 30 are formed respectively on the opposite sides of the connector 27. Therefore, the connecting electrode section 34 of the electrode plate 22 does not have any thin area although the electrode plate 22 is formed by press molding, so that no cracks will appear when welding the projections and hence no leakage of solution will occur in the battery module 42. Additionally, since the negative welding electrode 38 is made to directly contact the outer peripheral surface of the cell case 19 for the projection welding process, the cell case 19 is held in a stable condition for the welding operation, so that reliably welded good products are always obtained without producing rejects.

Figure 14:
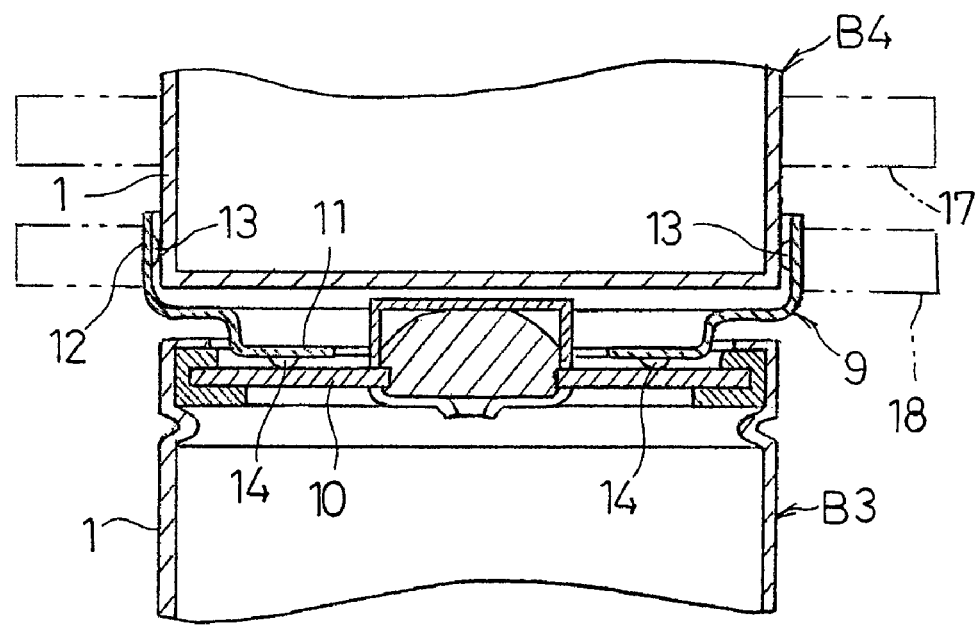
FIG. 14 is a longitudinal cross sectional view of another conventional cell connecting structure before cells are actually connected.

While the electric current flowing through the connector 27 is concentrated exclusively to the nuggets 39 and 41 in the above described cell connecting structure, the corresponding ones of the projections 29 and 30 for projection welding arranged on the opposite sides of the connector 27 bearing the nuggets 39 and 41 are radially aligned as shown in FIG. 2A, so that the current path between the adjacent cells Ba1 and Ba2 is minimized between the electrode plate 22 and the cell case 19 with the connector 27 interposed therebetween to by turn minimize the electric resistance. Additionally, in the battery module 42 made by using the cell connecting structure, the connectors 27 connecting the cells Ba1 through Ba6 have a diameter equal to or slightly smaller than that of the cell cases 19 and hence the cell cases 19 are not provided with any outward projections unlike the cylindrical section 12 of the connector 9 of the conventional cell connecting structure shown in FIG. 14. The module 42 is thus housed in a cylindrical housing having a very simple profile.

Figure 5:
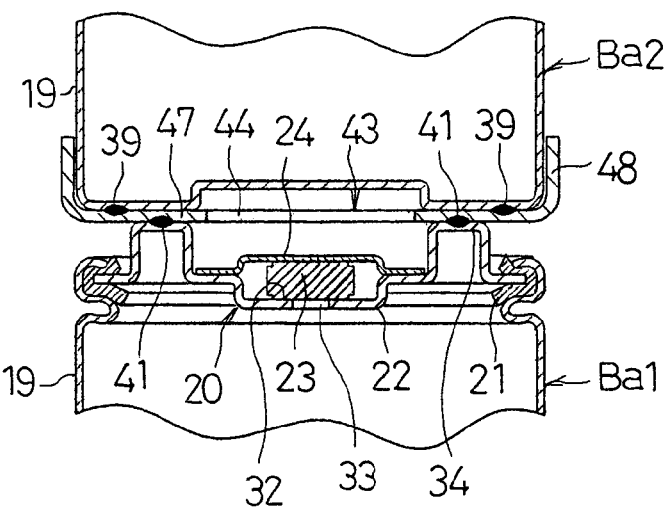
FIG. 5 is a longitudinal cross sectional view of a cell connecting structure according to a second embodiment of the invention.

FIG. 5 is a schematic longitudinal cross sectional view of a cell connecting structure according to a second embodiment of the invention. In FIG. 5, the components same as or similar to those of FIG. 1 are denoted respectively by the same reference symbols and will not be described any further. This embodiment differs from the first embodiment only in the profile of a connector 43.

Figure 6A:
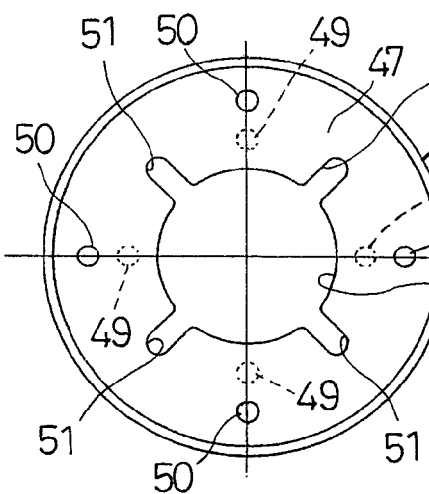
FIGS. 6A, 6B, and 6C are respectively a plan view, a perspective view and a front view of the connector used in the second embodiment.
Figure 6B:
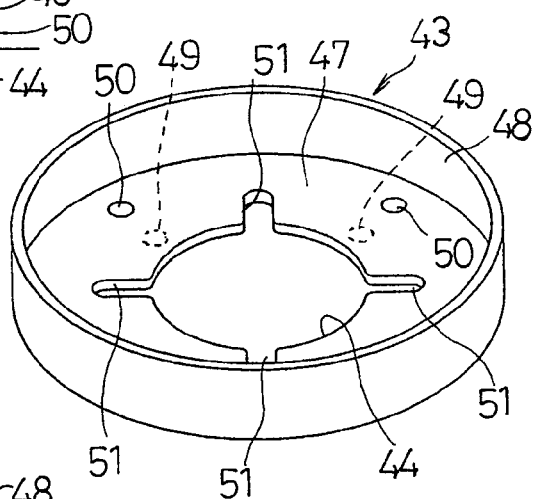
Figure 6C:
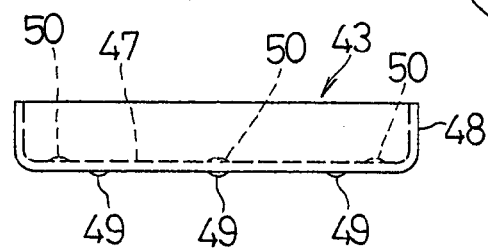

FIGS. 6A, 6B, and 6C are respectively a schematic plan view, a schematic perspective view, and a schematic front view of one of the connectors 43 used in this embodiment. Referring to FIGS. 6A through 6C, the connector 43 has as integral parts thereof a flat bottom section 47 made of a metal disk having a diameter substantially equal to the outer diameter of the cell case 19 and a concentric through hole 44 formed at the center thereof to make it show a ring-like profile and a cylindrical section 48 standing upright from the periphery of the bottom section 47 and having an inner diameter adapted to cover the corresponding cell case 19.

Four projections 49 for projection welding are formed along an imaginary circle on a side (the lower side in FIG. 6C) of the bottom section 47, while four projections 50 for projection welding are also formed along another imaginary circle on the other side (the upper side in FIG. 6C) of the bottom section 47. As seen from FIG. 6A, the corresponding ones of the projections 49 and 50 are radially aligned. Notches 51 are formed along the through hole 44 at the respective middle positions of any adjacent ones of the projections 49 or 50. The notches 51 are designed to reduce the reactive current that can flow in the projection welding process, which will be described hereinafter.

Now, the process for connecting the two cells Ba1 and Ba2 by the use of the connector 43 will be described with reference to FIGS. 7A and 7B. Firstly, the connector 43 is welded to the bottom of the cell case 19 of the cell Ba2 located above the other cell Ba1. FIG. 7A is a schematic longitudinal cross sectional view showing the connector 43 before being welded to the cell Ba2. The connector 43 is mounted on the positive welding electrode 37 and the cell case 19 of the upper cell Ba2 is partly put into the cylindrical section 48 of the connector 43 while the paired pieces of negative welding electrode 38 are made to abut the outer peripheral surface of the cell case 19 of the cell Ba2. The paired pieces of negative welding electrode 38 are identical with their counterparts shown in FIG. 3B and made to contact the cell case 19 at the opposite sides thereof as they are forced to directly pinch the cell case 19. Under this condition, the cell Ba2 is pressed downward so that the bottom of the cell case 19 is pressed against the corresponding four projections 50 of the connector 43.

Then, a predetermined high DC voltage is applied across the welding electrodes 37 and 38 for projection welding. The welding current is concentrated to the contact areas of the small projections 50 and the cell case 19 that are very small so that consequently the projections 50 are molten by generated heat and the connector 43 and the cell case 19 are welded onto each other at the nuggets 39 shown in FIG. 7B as almost the entire upper surface of the connector 43 is held in tight contact with the bottom surface of the cell case 19. Thus, the connector 43 and the cell case 19 of the upper cell Ba2 are bonded together. Since the cell case 19 of the cell Ba2 is inserted into the cylindrical section 48 of the connector 43 at a lower end portion thereof, it is held in a stable state there, so that the negative welding electrode 38 is reliably held in contact with the outer peripheral surface of the cell case 19 of the cell Ba2 and the projection welding operation is conducted easily and reliably.

Subsequently, as shown in FIG. 7B, the connector 43 bonded to the bottom surface of the cell case 19 of the cell Ba2 is mounted on the connecting electrode section 34 of the electrode plate 22 of the lower cell Ba1, and the paired pieces of negative welding electrode 38 are made to contact the outer peripheral surface of the upper cell Ba2 while the plate-shaped insert 40a of the positive welding electrode 40 is made to contact the periphery of the connecting electrode section 34 of the lower cell Ba1 for projection welding. Thereby, the projections 49 are molten by generated heat and the connector 43 and the electrode plate 22 are bonded to each other at the nuggets 41 shown in FIG. 5 as the annular section of the lower side of the connector 27 bearing the four projection 49 is held in tight contact with the connecting electrode section 34 of the electrode plate 22.

Thus, the cells Ba1 and Ba2 are connected in series by way of the connector 43. Note that the positive welding electrode 40 that is made to abut the periphery of the connecting electrode section 34 of the cell Ba1 is identical with its counterpart of the first embodiment shown in FIG. 3C. It has the plate-shaped insert 40a having a thickness adapted to make itself to be inserted into the gap between the top of the cell Ba1 and the connector 43 and the plate-shaped insert 40a is provided on the opposite sides thereof except the contact surface at the front end thereof with an insulating sheet typically formed by applying a fluorine type resin.

Figure 8A:
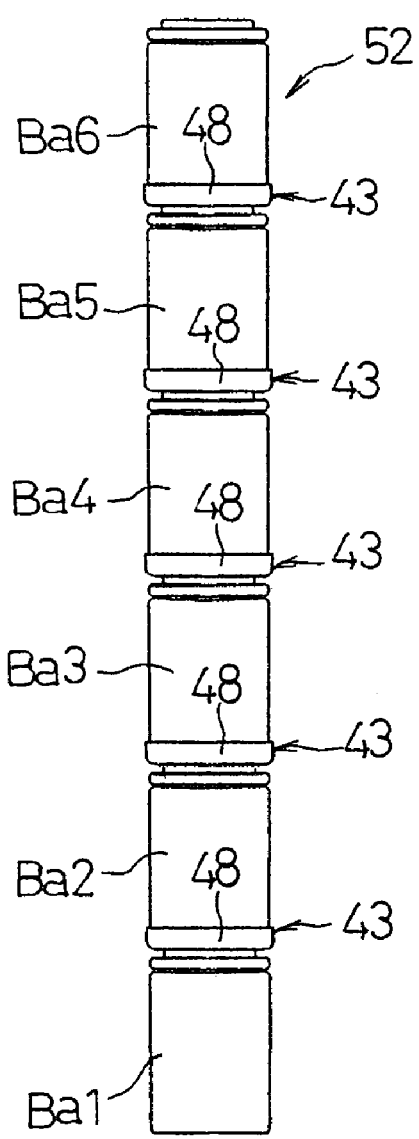
FIGS. 8A and 8B are respectively a front view and a perspective view of a battery module made by bonding and electrically connecting a plurality of cells by employing the cell connecting structure as shown in FIG. 5.
Figure 8B:
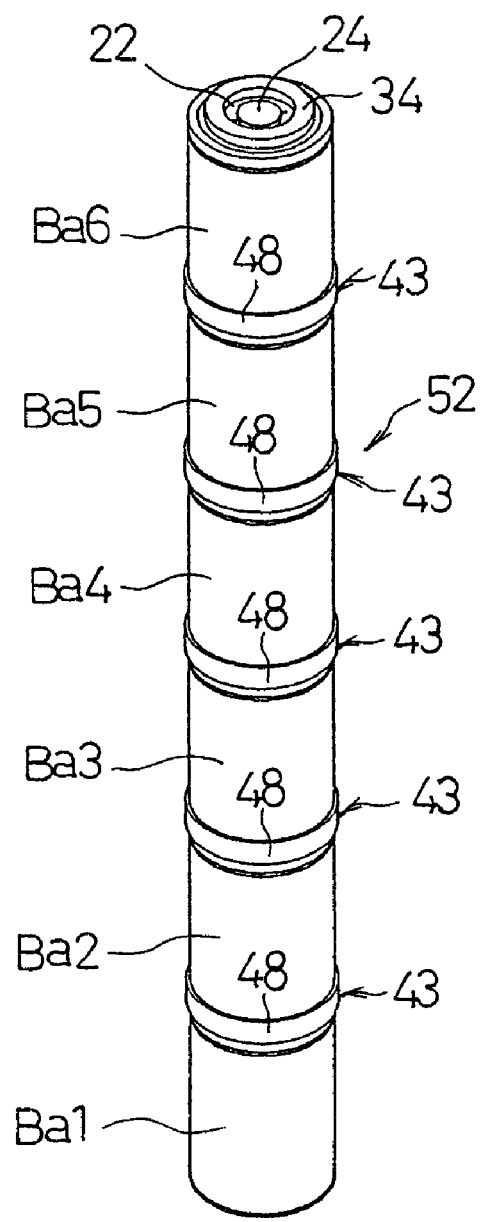

A number of cells for producing the desired output voltage are bonded together to produce a battery module employing the above described cell connecting structure. For example, six cells Ba1 through Ba6 may be bonded to produce a battery module 52 as shown in FIGS. 8A and 8B. An ordinary cell may be used for the uppermost cell Ba6. With the above described cell connecting structure, it is not necessary to form projections for projection welding on the connecting electrode section 34 of the electrode plate 22 because the projections 49 and 50 are formed respectively on the opposite sides of the bottom section 47 of the connector 43. Therefore, the connecting electrode section 34 of the electrode plate 22 does not have any thin area although the electrode plate 22 is formed by press molding, so that no cracks will appear when welding the projections and hence no leakage of solution will occur in the battery module 52. Additionally, since the upper cell Ba2 is reliably received in the cylindrical section 48 of the connector 43 and the negative welding electrode 38 is made to directly contact the outer peripheral surface of the cell case 19 for the projection welding process, the cell case 19 is held in a stable condition for the welding operation so that reliably welded good products are always obtained without producing rejects.

While the electric current flowing through the connector 43 is concentrated exclusively to the nuggets 39 and 41 in the above described cell connecting structure, the corresponding ones of the projections 49 and 50 for projection welding arranged on the opposite sides of the connector 43 bearing the nuggets 39 and 41 are radially aligned as shown in FIG. 6A, so that the current path between the adjacent cells Ba1 and Ba2 is minimized between the electrode plate 22 and the cell case 19 with the connector 43 interposed between them to by turn minimize the electric resistance.

FIG. 9 is a schematic longitudinal cross sectional view of a cell connecting structure according to a third embodiment of the invention. In FIG. 9, the components same as or similar to those of FIG. 1 are denoted respectively by the same reference symbols and will not be described any further. The cells Ba7 and Ba8 to be connected by this embodiment of cell connecting structure are same and identical, and conforming to the same standard. They differ from the cells Ba1 through Ba6 fabricated by the first or second embodiment of the invention only in that electrode plates 54 do not have any connecting electrode section and hence have a substantially flat plate-like profile. Accordingly, the cells Ba7 and Ba8 are prepared by a very simple process. Additionally, the lower cell Ba7 is provided with an insulating member 67 covering the sealing member 20, which will be described in greater detail hereinafter.

FIGS. 10A, 10B, 10C, and 10D are respectively a schematic plan view, a schematic perspective over view, a schematic front view, and a schematic perspective under view of the connector 57 used in the embodiment of cell connecting structure of FIG. 9. Referring to FIGS. 10A through 10D, the connector 57 includes a circular bottom section 59 made of a metal disk having a diameter approximately equal to the outer diameter of the cell case 19 and a concentric through hole 58 formed at the center thereof to make it show a ring-like profile, a wall section 60 standing from the outer peripheral edge of the bottom section 59 and a ring-shaped connection flange 61 extending outwardly from the top of the standing wall section 60. The standing wall section 60 has a height greater than the vent holder plate 24 operating as a positive electrode.

Four projections 62 for projection welding are formed along an imaginary circle on a side (the lower side in FIG. 10C) of the bottom section 59, while four projections 63 for projection welding are also formed along another imaginary circle on the other side (the upper side in FIG. 10C) of the connection flange 61. As seen from FIG. 10A, the corresponding ones of the projections 62 and 63 are radially aligned. Notches 64 are formed along the through hole 58 at the respective middle positions of any adjacent ones of the projections 62 or 63. The notches 64 are designed to reduce the reactive current that can flow in the projection welding process, which will be described hereinafter.

Figure 11A:
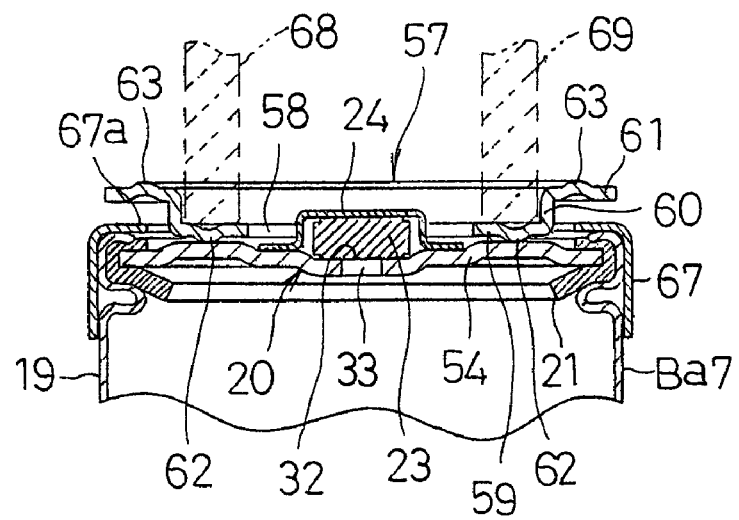
FIG. 11A is a cross sectional view of a step of bonding two cells in the third embodiment, showing the connector before being welded to the cell case of one of the cells.

Now, the process for connecting the two cells Ba7 and Ba8 by the use of the connector 57 will be described with reference to FIGS. 11A and 11B. Firstly, in this embodiment, the connector 57 is welded to the top surface of the electrode plate 54 of the lower cell Ba7. FIG. 11A is a schematic cross sectional view of a step of bonding two cells in this embodiment, showing the connector 57 before being welded to the cell Ba7. Firstly, the insulating member 67 having a ring-shaped engaging piece 67a projecting inwardly from the peripheral edge of the opening located at an end of the cylindrical part thereof that can be put around the cell case 19 is arranged to cover the cell case 19 and the engaging piece 67a is hooked to the caulked section of the cell case 19 at the corresponding end of the cell Ba7.

Subsequently, the vent holder plate 24 is made to extend through the through hole 58 and the connector 57 is mounted on the electrode plate 54 of the cell Ba7. Then, positive and negative welding electrodes 68 and 69 are pressed against the respective corresponding positions of the bottom section 59 of the connector 57 located to face to the projections 62. Thus, the four projections 62 of the connector 57 are pressed against the electrode plate 54.

Then, a predetermined high DC voltage is applied across the welding electrodes 68 and 69 for projection welding. The welding current is concentrated to the contact areas of the small projections 62 and the electrode plate 54, so that consequently the projections 62 are molten by generated heat and the connector 57 and the electrode plate 54 are welded onto each other at the nuggets 41 as almost the entire upper surface of the bottom section 59 of the connector 57 is held in tight contact with the electrode plate 54. Thus, the connector 57 and the electrode plate 54 are bonded together.

Figure 11B:
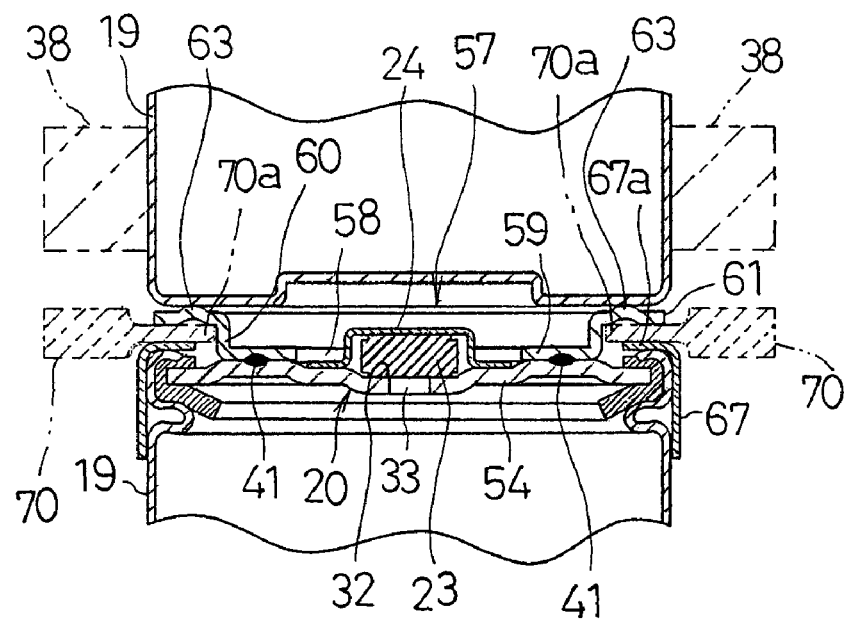
FIG. 11B is a cross sectional view of the connector before being welded to the electrode plate of the other cell.

Subsequently, as shown in FIG. 11B, the cell case 19 of the upper cell Ba8 is mounted on the connection flange 61 of the connector 57 bonded to the electrode plate 54 of the cell Ba7, and the negative welding electrode 38 is made to abut the outer peripheral surface of the cell case 19 of the cell Ba8 while a plate-shaped insert 70a of a positive welding electrode 70 is made to abut the lower surface of the connection flange 61 of the connector 57 for projection welding. Note that the plate-shaped insert 70a of the welding electrode 70 is made to have a thickness substantially equal to the gap between the engaging piece 67a of the insulating member 67 and the connection flange 61 of the connector 57, and not provided with an insulating sheet unlike the plate-shaped insert 40a of the positive welding electrode 40 used for the first or second embodiment. This is because the plate-shaped insert 70a does not come to contact the cell case 19 of the lower cell Ba7 because of the provision of the engaging piece 67a of the insulating member 67 and it needs to be brought into electric contact with the connector 57.

As the upper cell Ba8 is pressed against the lower cell Ba7 by way of the connector 57, the plate-shaped insert 70a interposed between the engaging piece 67a of the insulating member 67 and the connection flange 61 of the connector 57 supports the connection flange 61 in order to prevent the latter from being deformed and causes the projections 63 of the connection flange 61 to reliably and tightly contact the bottom of the cell case 19 of the upper cell Ba8. Thereby, the projection welding operation is carried out reliably, although the connection flange 61 of the connector 57 is integral with the latter but held in an unstable state.

As a result of the projection welding operation, the projections 63 are molten by generated heat and the connection flange 61 of the connector 57 and the bottom of the cell case 19 are bonded to each other at the nuggets 39 shown in FIG. 9 as the connection flange 61 is almost entirely held in tight contact with the bottom of the cell case 19. The cells Ba7 and Ba8 are connected in series by way of the connector 57.

Figure 12A:
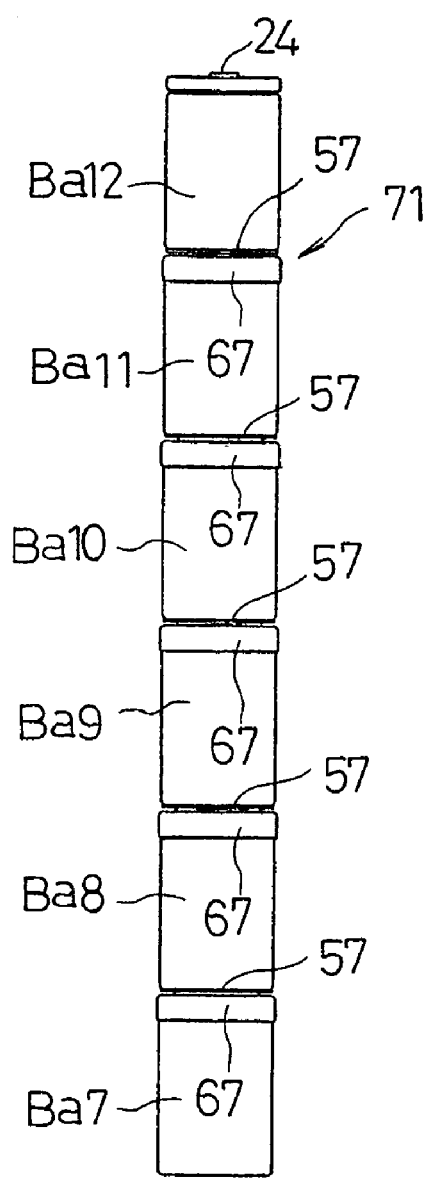
FIGS. 12A and 12B are respectively a front view and a perspective view of a battery module made by bonding and electrically connecting a plurality of cells by employing the cell connecting structure as shown in FIG. 9.
Figure 12B:
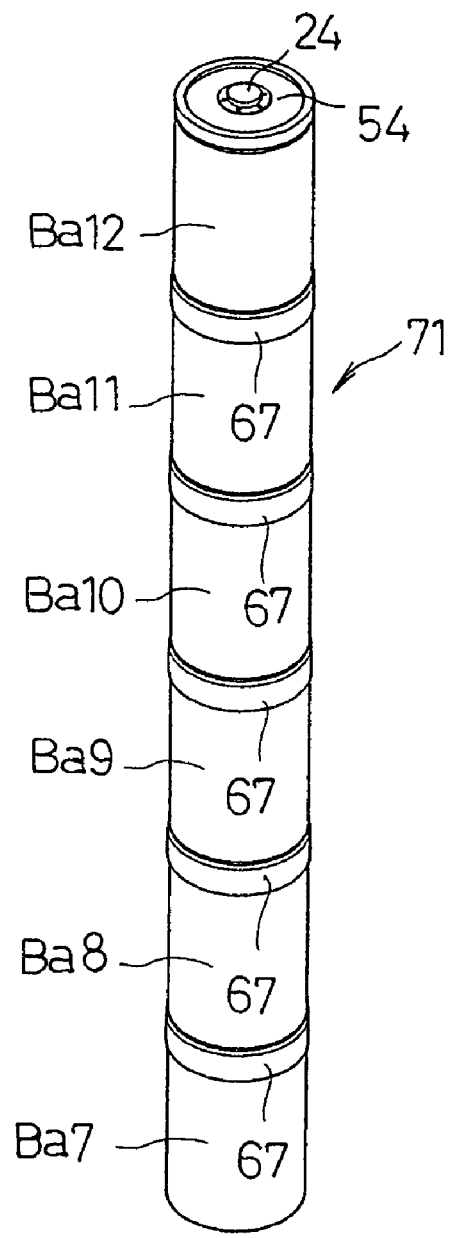

A number of cells for producing the desired output voltage are bonded together to produce a battery module by the above described cell connecting method. For example, six cells Ba7 through Ba12 may be bonded to produce a battery module 71 as shown in FIGS. 12A and 12B. An ordinary cell may be used for the uppermost cell Ba12. With the above described cell connecting structure, again, it is not necessary to form projections for projection welding on the electrode plate 54 because the projections 62 and 63 are formed respectively on the opposite sides of the connector 57. Therefore, the electrode plate 54 does not have any thin area although it is formed by press molding, so that no cracks will appear when welding the projections and hence no leakage of solution will occur in the battery module 71. Additionally, since the negative welding electrode 38 is made to directly contact the outer peripheral surface of the cell case 19 for the projection welding process, the cell case 19 is held in a stable condition for the welding operation, so that reliably welded good products are always obtained without producing rejects.

While the electric current flowing through the connector 57 is concentrated exclusively to the nuggets 39 and 41 in the above described cell connecting structure, the corresponding ones of the projections 62 and 63 for projection welding arranged on the opposite sides of the connector 57 bearing the nuggets 39 and 41 are radially aligned as shown in FIG. 10A, so that the current path between the adjacent cells Ba7 and Ba8 is minimized between the electrode plate 54 and the cell case 19 with the connector 57 interposed therebetween to by turn minimize the electric resistance. Additionally, in the battery module 71 formed by using the embodiment of cell connecting structure, the connectors 57 connecting the cells Ba7 through Ba12 have a diameter equal to or slightly smaller than that of the cell cases 19 and hence the cell cases 19 are not provided with any outward projections unlike the cylindrical section 12 of the connector 9 of the conventional cell connecting structure shown in FIG. 14. The module 71 is thus housed in a cylindrical housing having a very simple profile.

INDUSTRIAL APPLICABILITY

As described above, according to the cell connecting structure of the invention including a connector provided on the opposite sides thereof with projections for projection welding, it is no longer necessary to provide the connecting electrode section of the electrode plate with projections for projection welding. Consequently, the electrode plate does not have any thin area and no cracks will appear when welding the projections and hence no leakage of solution will occur during the projection welding process.

According to the cell connecting method of the invention, the cell case is held in a stable condition for the projection welding operation so that reliably welded good products are always obtained without producing rejects.

The invention claimed is:

1. A cell connecting structure for bonding adjacent ones of a plurality of cells arranged in series by the use of a connector in order to establish electric connection thereof, each of said cells having a bottomed cylindrical cell case operating as an electrode and a sealing member for closing an opening of the cell case, said sealing member operating as an opposite electrode, wherein said connector has a plurality of projections for projection welding formed on each of the opposite sides thereof, an electrode plate of said sealing member of one of the two adjacent cells to be connected is bonded to a side of said connector by projection welding by way of the projections on said side so that said one cell is welded at an end only thereof to said connector, and the cell case of the other cell is bonded to the other side of said connector by projection welding by way of the projections on said other side so that said other cell is welded at an end only thereof to said connector.

2. The cell connecting structure according to claim 1, wherein said connector has a flat plate-shaped profile corresponding to a profile of the cell case, a ring-shaped connecting electrode section axially outwardly projecting is formed at a position along the outer periphery of the electrode plate, said connecting electrode section being bonded and connected by projection welding to said side of said connector at a plurality of positions by way of the projections.

3. The cell connecting structure according to claim 1, wherein said connector has a flat plate-shaped bottom section having a profile corresponding to a profile of the cell case and a cylindrical section extending perpendicularly from the periphery of said bottom section, a ring-shaped connecting electrode section axially outwardly projecting is formed at a position along the outer periphery of the electrode plate, said connecting electrode section being bonded and connected by projection welding to said side of said connector at a plurality of positions by way of the corresponding projections, and the bottom of said cell case being partly put into said cylindrical section is bonded and connected by projection welding to said other side of said connector by way of the corresponding projections.

4. The cell connecting structure according to claim 1, wherein said connector has a circular bottom section having a through hole for allowing the electrode axially outwardly projecting from a central part of the sealing member to pass through it, a wall section standing perpendicularly from an outer peripheral edge of the bottom section above said electrode, and a ring-shaped connection flange extending from a periphery of a top of the wall section and having an outer profile corresponding to an outer profile of the cell case, said electrode plate of said cell is bonded and connected by projection welding to said side of said bottom section at a plurality of positions by way of the projections, and the bottom of said cell case of said other cell is bonded and connected by projection welding to said other side of said connection flange by way of the projections.

5. A cell connecting method for bonding adjacent ones of a plurality of cells arranged in series by the use of a connector in order to establish electric connection thereof, each of said cells having a bottomed cylindrical cell case operating as an electrode and a sealing member for closing an opening of the cell case, said sealing member operating as an opposite electrode, the method comprising:

forming a plurality of projections for projection welding on each of opposite sides of said connector having a plate-shaped outer profile corresponding to an outer profile of said cell case;

placing the bottom of the cell case of one of any two adjacent cells in contact with the projections on one side of said connector;

abutting welding electrodes respectively on the other side of said connector and the outer peripheral surface of said cell case;

applying a voltage across said welding electrodes for bonding the bottom of said cell case and said side of said connector so that said one cell is welded at an end only thereof to said connector;

placing a connecting electrode section, axially outwardly projecting, of the electrode plate of said other cell in contact with the projections of the other side of said connector;

abutting the welding electrodes respectively on the peripheral surface of said connecting electrode section and the outer peripheral surface of the cell case of the cell; and applying a voltage across said welding electrodes for bonding said connecting electrode section and said other side of said connector so that said other cell is welded at an end only thereof to said connector.

6. A cell connecting method for bonding adjacent ones of a plurality of cells arranged in series by the use of a connector in order to establish electric connection thereof, each of said cells having a bottomed cylindrical cell case operating as an electrode and a sealing member for closing an opening of the cell case, said sealing member operating as an opposite electrode, said connector having an outer profile corresponding to an outer profile of said cell case and formed by a flat bottom and a cylindrical section standing perpendicularly from a periphery of said flat bottom, the method comprising:

forming a plurality of projections for projection welding on each of the opposite sides of said connector;

placing the bottom of the cell case of one of any two adjacent cells in contact with the projections on one side of said connector;

abutting welding electrodes respectively on the other side of said connector and an outer peripheral surface of said cell case;

applying a voltage across said welding electrodes for bonding the bottom of said cell case and said side of said connector so that said one cell is welded at an end only thereof to said connector;

placing a connecting electrode section, axially outwardly projecting, of the electrode plate of said other cell in contact with the projections of the other side of said connector;

abutting the welding electrodes respectively on the peripheral surface of said connecting electrode section and the outer peripheral surface of the cell case of the cell; and applying a voltage across said welding electrodes for bonding said connecting electrode section and said other side of said connector so that said other cell is welded at an end only thereof to said connector.

7. A cell connecting method for bonding adjacent ones of a plurality of cells arranged in series by the use of a connector in order to establish electric connection thereof, each of said cells having a bottomed cylindrical cell case operating as an electrode and a sealing member for closing an opening of the cell case, said sealing member operating as an opposite electrode, said connector having a bottom, a wall section standing upward perpendicularly from an outer periphery of said bottom, and a connection flange extending outwardly from the top end of said wall section in parallel with said bottom, the method comprising:

forming a plurality of projections for projection welding on one of the opposite sides of the bottom of said connector and also a plurality of projections for projection welding on the opposite side of the connection flange of the connector;

placing a flat electrode plate of one of any two adjacent cells in contact with the projections on the bottom of said connector;

abutting welding electrodes on the respective positions on the other side of said connector corresponding to the projections on said sides of said connector;

applying a voltage across said welding electrodes for bonding said electrode plate and said connector so that said one cell is welded at an end only thereof to said connector;

placing the bottom of the cell case of the other cell in contact with the projections on said connection flange of the connector;

abutting the welding electrodes respectively on the corresponding surface of said connection flange and the outer peripheral surface of the cell case of the other cell; and applying a voltage across said welding electrodes for bonding said connection flange of the connector and the bottom of said cell case so that said other cell is welded at an end only thereof to said connector.

8. A cell connecting structure for bonding adjacent ones of a plurality of cells arranged in series by the use of a connector in order to establish electric connection thereof, each of said cells having a bottomed cylindrical cell case operating as an electrode and a sealing member for closing an opening of the cell case, said sealing member operating as an opposite electrode, wherein said connector has a plurality of projections for projection welding formed on each of the opposite sides thereof, an electrode plate of said sealing member of one of the two adjacent cells to be connected is bonded to a side of said connector by projection welding by way of the projections on said side, and the cell case of the other cell is bonded to the other side of said connector by projection welding by way of the projections on said other side;

wherein said connector has a flat plate-shaped profile corresponding to a profile of the cell case; and a ring-shaped connecting electrode section axially outwardly projecting is formed at a position along the outer periphery of the electrode plate, said connecting electrode section being bonded and connected by projection welding to said side of said connector at a plurality of positions by way of the projections.

9. A cell connecting structure for bonding adjacent ones of a plurality of cells arranged in series by the use of a connector in order to establish electric connection thereof, each of said cells having a bottomed cylindrical cell case operating as an electrode and a sealing member for closing an opening of the cell case, said sealing member operating as an opposite electrode, wherein said connector has a plurality of projections for projection welding formed on each of the opposite sides thereof, an electrode plate of said sealing member of one of the two adjacent cells to be connected is bonded to a side of said connector by projection welding by way of the projections on said side, and the cell case of the other cell is bonded to the other side of said connector by projection welding by way of the projections on said other side;

wherein said connector has a flat plate-shaped bottom section having a profile corresponding to a profile of the cell case and a cylindrical section extending perpendicularly from the periphery of said bottom section;

a ring-shaped connecting electrode section axially outwardly projecting is formed at a position along the outer periphery of the electrode plate, said connecting electrode section being bonded and connected by projection welding to said side of said connector at a plurality of positions by way of the corresponding projections, and the bottom of said cell case being partly put into said cylindrical section is bonded and connected by projection welding to said other side of said connector by way of the corresponding projections.

* * * * *